Nov. 8, 1949     C. S. KELLEY     2,487,142
TREATMENT OF HYDROCARBONS
Filed Nov. 12, 1946
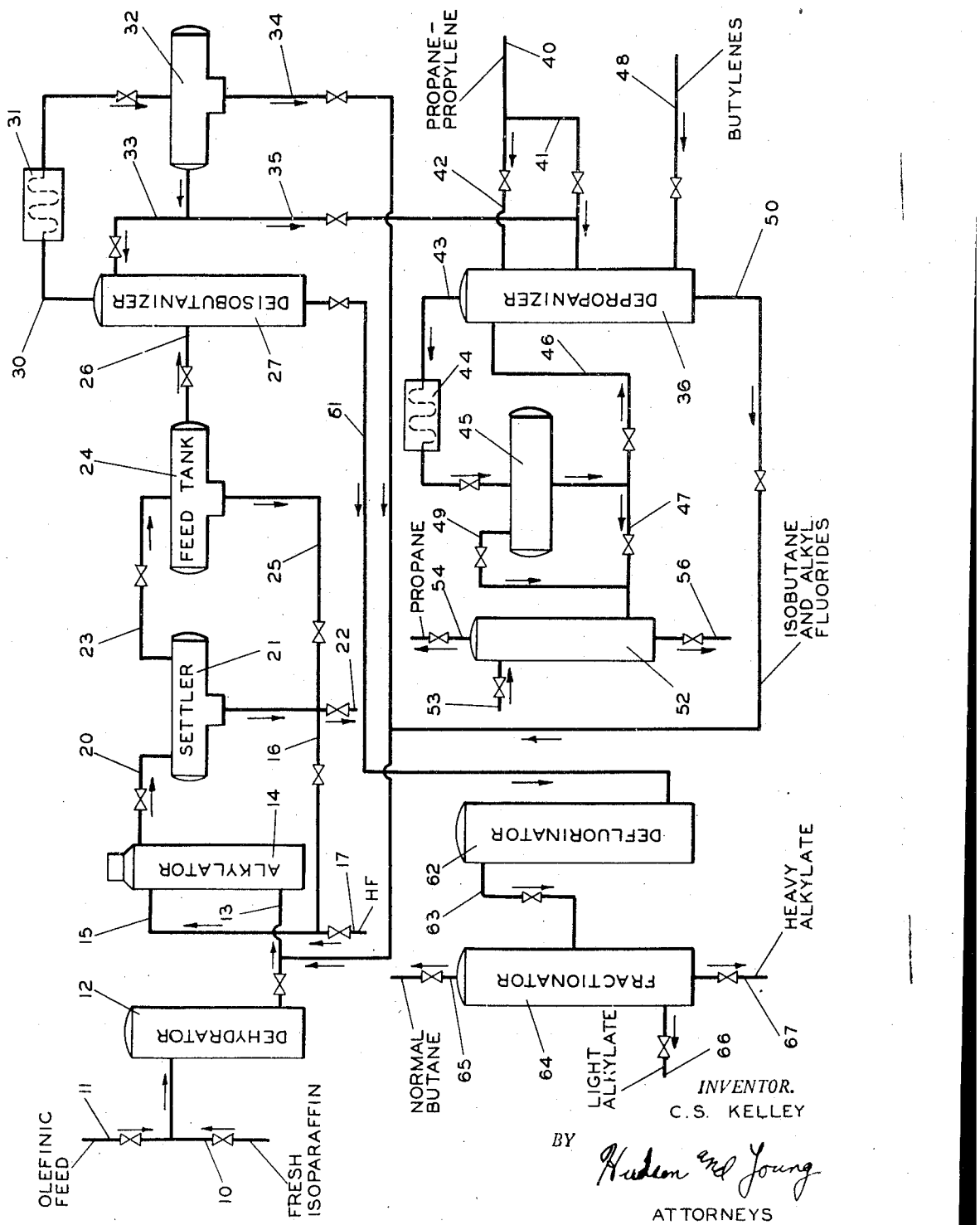
INVENTOR.
C. S. KELLEY
BY
Hudson and Young
ATTORNEYS Patented Nov. 8, 1949

2,487,142

UNITED STATES PATENT OFFICE 2,487,142

TREATMENT OF HYDROCARBONS

Carl S. Kelley, Bartlesville, Okla., assignor to Phillips Petroleum Company, a corporation of Delaware Application November 12, 1946, Serial No. 709,318

6 Claims. (Cl. 260—676)

The invention relates to the removal of hydrogen fluoride from hydrocarbon mixtures containing the same. In one aspect this invention relates to the removal of hydrogen fluoride from organic mixtures containing in addition hydrogen and/or low-boiling hydrocarbons, especially low-boiling saturated hydrocarbons, such as ethane, methane and propane. In another aspect this invention relates to an improved process for the reaction of an alkylatable hydrocarbon with an alkylating agent in the presence of a hydrogen fluoride alkylation catalyst to produce paraffin hydrocarbons of higher molecular weight.

Hydrogen fluoride in the form of a liquid, commonly used as highly concentrated or substantially anhydrous hydrofluoric acid, has recently come into prominence as a very important catalyst for numerous organic reactions. For example, it is used alone or in a mixture with minor amounts of a boron halide, such as boron fluoride, as a catalyst in the conversion of hydrocarbons, such as alkylation, isomerization, disproportionation, and the like, and is also used as a refining agent and/or a selective solvent to remove materials, such as organic fluorine compounds, sulfur compounds, and other non-hydrocarbon organic impurities from liquid hydrocarbon materials, such as effluents of a hydrocarbon-alkylation step, natural gasoline, lubricating oil fractions, and the like. In these and other processes the hydrogen fluoride is a valuable material which must be conserved and recovered from by-products, etc.

Perhaps the most important industrial process at the present time which involves the use of hydrofluoric acid as a catalyst is the alkylation of low-boiling paraffinic hydrocarbons, particularly isobutane and/or isopentane, with alkylating reactants, particularly low-boiling olefins, such as propylene, various butylenes, various amylenes, and/or di-isobutylene and tri-isobutylene to form normally liquid paraffins which generally have high octane numbers and are quite valuable as constituents of aviation fuels. In such alkylation processes the reactants are intimately contacted in the liquid phase at a temperature between about 50 and about 150° F. and sufficient pressure to maintain the reactant in the liquid phase with liquid concentrated hydrofluoric acid for reaction periods ranging from about 1 to about 30 minutes. The molar ratio of paraffin to olefin in the feed is usually between about 3:1 and about 10:1. The reaction effluent is passed to a settling zone where a liquid hydrocarbon-rich phase and a heavier liquid acid-rich phase are formed and separated. A large portion of the liquid hydrofluoric acid phase in the settling zone is recycled to the reaction zone, although a portion thereof is generally withdrawn and subjected to purification for the removal of such impurities as water and acid soluble oils. The hydrocarbon-rich phase containing dissolved hydrogen fluoride is subjected to fractional distillation to remove hydrogen fluoride which is generally present to the extent of about 0.5 to about 3 per cent by volume. The overhead from this distillation which comprises substantially an azeotropic mixture of hydrogen fluoride and low-boiling hydrocarbons is condensed whereby a hydrocarbon-rich phase and a liquid hydrofluoric-rich phase are formed. The hydrocarbon-rich phase may be returned to the reactor or to the distillation zone as reflux, etc., while the hydrogen fluoride-rich phase is returned to the reactor or to the settling zone.

In another method of operation of an alkylation process as described in my copending application, Serial No. 651,963, filed March 4, 1946, now U. S. Patent 2,448,601, issued September 7, 1948, the hydrocarbon-rich phase containing dissolved hydrogen fluoride is passed from the settling zone directly to a deisobutanizer. In this method of operation the step for the removal of hydrogen fluoride from the hydrocarbon-rich phase by distillation is omitted. In the deisobutanizer, isobutane and lighter hydrocarbons including hydrogen fluoride are recovered as an overhead product and normal butane and heavier hydrocarbons including some alkyl fluorides are removed as a bottom product. The bottom product is further treated to recover the alkylation product. The overhead product is passed to a depropanizer in which propane and lighter hydrocarbons are separated from isobutane. However, since hydrogen fluoride is present in the feed stream to the depropanizer, an olefinic hydrocarbon stream is introduced into the depropanizer in order that the olefin may react with the hydrogen fluoride to remove it with the bottom product. The resulting alkyl fluoride formed by the reaction of the olefin with hydrogen fluoride in the depropanzier is removed as a bottom product with the isobutane; thus, substantially all of the hydrogen fluoride is prevented from passing overhead with the propane. Contamination of the propane with hydrogen fluoride prevents use for many purposes such as a fuel, and also constitutes a loss of hydrogen fluoride. The isobutane and alkyl fluoride from the depropanizer may be returned to the reaction zone.

In the first method of operation in which hydrogen fluoride is removed from the hydrocarbon stream by distillation, a portion of this overhead from the hydrogen fluoride distillation zone is vented in order to prevent a build up of too high a pressure in the alkylation system. Such a build up of pressure is caused by the accumulation of light gases, such as hydrogen, methane, ethane and some propane. The venting of these gases carries with it hydrogen fluoride, which factor constitutes an economical loss of hydrogen fluoride as well as a health hazard. Likewise hydrogen fluoride is lost with the propane overhead from the depropanizer in the second described operation even though the major portion of the hydrogen fluoride is removed by reaction with the olefin in the depropanizer. It is, therefore, desirable to remove the hydrogen fluoride from these streams, such as by caustic washing, in order to enable their future use.

Hydrogen sulfide and low-boiling mercaptans are also commonly found as contaminates or impurities in the overhead from the depropanizer in the second of the above discussed operations. In such case the hydrogen sulfide and mercaptans are introduced into the system with the olefinic hydrocarbon stream which often contains substantial proportions of these materials. Small amounts of hydrogen sulfide and mercaptans may also contaminate the vent gases along with hydrogen fluoride in the first of the above described operations, although not to the extent found in the depropanizer overhead of the second operation, hydrogen sulfide and mercaptans being in the feed charged to the alkylation process but because of their conversion are primarily removed either with the liquid acid phase or liquid hydrocarbon phase as soluble materials. In removing hydrogen fluoride by a caustic wash solution of sodium hydroxide, the hydrogen sulfide and mercaptans will also be removed which fact results in an increased and unnecessary consumption of the caustic wash solution. It is much to be desired to provide a method for removing hydrogen fluoride without also removing hydrogen sulfide and mercaptans from a low-boiling hydrocarbon stream containing same, both to decrease caustic consumption as stated and retain the benefits of the heating value which may be derived from the combustion of the sulfur compounds when the hydrocarbon stream is used as a fuel.

This invention is a continuation-in-part of my copending application Serial No. 651,963, filed March 4, 1946, now U. S. Patent 2,448,601, issued September 7, 1948, in which a novel process for the alkylation of an isoparaffin is described.

It is an object of this invention to improve the operation of a process for reacting a low-boiling isoparaffin with an alkylating agent.

Another object of this invention is to remove propane from an alkylation process wherein hydrogen fluoride is employed as a catalyst without removing hydrogen fluoride from the system at the same time.

It is still a further object of this invention to remove hydrogen fluoride from a low-boiling hydrocarbon stream containing hydrogen fluoride and hydrogen sulfide without simultaneously removing the hydrogen sulfide.

Another object of this invention is to provide a selective absorption process.

It is still a further object of this invention to remove vaporous hydrogen fluoride from a gaseous mixture containing the same.

Yet another object of this invention is to remove hydrogen fluoride from a liquid propane stream.

Various other objects and advantages of the present invention will become apparent to those skilled in the art from the accompanying description and disclosure.

According to my invention, I have found that hydrogen fluoride may be selectively removed from a hydrocarbon mixture containing less than about one per cent hydrogen fluoride and hydrogen sulfide by contacting such a mixture with a solution of sodium bisulfide, preferably a 2 to 4 per cent aqueous solution of sodium bisulfide. The hydrocarbon mixture is contacted in an absorption zone, either in the liquid or vapor phase, by a liquid solution of sodium bisulfide whereby hydrogen fluoride combines with the sodium bisulfide to form sodium fluoride and hydrogen sulfide. The sodium fluoride is removed with the liquid aqueous solution from the absorption zone and the hydrogen sulfide formed in the absorption zone is removed with the hydrocarbon mixture, which is substantially free from hydrogen fluoride.

My invention will now be further described and discussed in connection with the accompanying drawing which forms a part of this application and which shows diagrammatically, by means of a flow sheet, an arrangement of apparatus suitable for use in practicing a preferred embodiment of my invention.

Referring now to the drawing, a paraffinic hydrocarbon stream having a high content of isoparaffin to be alkylated is introduced through line 10 and a stream comprising olefins to be reacted therewith is introduced through line 11. In practice, material entering through line 10 will comprise 90 to 98 per cent of a low-boiling isoparaffin, such as isobutane and/or isopentane. The stream added through line 11 can be a butane-butene mixture, such as is often available in a refinery from effluents of a cracking operation. In some instances it may also contain amylenes and/or some propylene, although, as is evident from the present disclosure, when it is desired to react propylene, this will be added to the system at a different point, as will be more fully discussed hereinafter. When olefinic polymers are available for reaction with a low-boiling isoparaffin, they may also be included in the feed passing through line 11 or in some instances may constitute the sole or main part of the olefins. Since most of these streams will contain some dissolved water they are combined and passed through dehydrator 12, which contains a suitable dehydrating agent such as alumina, bauxite, silica gel, calcium chloride, or the like. The dehydrated effluents pass through line 13, together with recycle isoparaffin returned through line 34, to alkylator 14 wherein they are intimately admixed with a hydrofluoric acid catalyst. This catalyst is introduced to alkylator 14 through line 15 and in commercial operations will comprise a major portion of recycled catalyst, which is returned to the process through line 16, and fresh hydrofluoric acid introduced through line 17. The reactants are treated under alkylation conditions well known to the art, such as reaction time of about 5 to about 20 minutes, a ratio of hydrocarbons to hydrofluoric acid between about 2:1 and 1:2, a reaction temperature between about 70 and about 120° F., and a pressure sufficient to maintain the reactants substantially entirely in liquid phase.

The physical mixture of hydrofluoric acid catalyst and hydrocarbons, containing unreacted paraffin hydrocarbons and products of the alkylation reactions, is passed from alkylator 14 through line 20 to settler 21, which is usually maintained at about the same temperature and pressures as alkylator 14. In this settler liquid hydrofluoric acid settles as a heavy liquid phase leaving a hydrocarbon phase which is substantially free from hydrogen fluoride, except for that material which is dissolved in the hydrocarbons or otherwise entrained therein, in an amount between about 0.2 and about 5 per cent thereof. The hydrofluoric acid phase is withdrawn through line 16 and a major portion of it is recycled as previously discussed. Since this material tends to have accumulated in it, small amounts of water and various organic impurities of high molecular weight, a portion is generally discharged, either continuously or from time to time, through line 22 for such treatment as may be desired. A hydrocarbon phase, generally substantially entirely liquid, is withdrawn from the upper portion of settler 21 through line 23 and passed to a deisobutanizer feed tank 24. This feed tank acts primarily as a surge tank, or accumulator, so that a steady flow of material to deisobutanizer 27 can be effected even though variations may be experienced in the operations of the equipment just discussed. In some instances a small amount of hydrofluoric acid may settle out in the bottom of this feed tank in which case it can be returned to the alkylation system by being passed through line 25 to line 16.

The hydrocarbon mixture, containing substantially only dissolved hydrofluoric acid, is passed from feed tank 24 through line 26 to deisobutanizer 27. This can be any suitable type of conventional fractional distillation column so designed that it will resist the corrosive action of hydrofluoric acid and will produce as an overhead product substantially all of the isobutane and lower-boiling hydrocarbons together with free hydrogen fluoride contained in the charge entering through line 26. Although hydrogen fluoride has a higher boiling point than isobutane, it forms a minimum-boiling azeotropic mixture with low-boiling paraffin hydrocarbons, as disclosed in Frey 2,322,800, issued June 29, 1943, and the small amount which is present in the feed to the deisobutanizer will readily pass overhead along with the unreacted isobutane and any propane which may be present. This low-boiling fraction is removed through line 30, cooled and condensed in condenser 31, and passed to reflux accumulator 32. A substantial portion is withdrawn through line 33 and returned to the top of deisobutanizer 27 as liquid reflux. Since the hydrocarbon material passing through line 26 is a saturated solution of hydrogen fluoride in hydrocarbons, and since a substantial portion of this hydrocarbon material is too high boiling to be present in the overhead fraction, there may be present more than sufficient hydrogen fluoride to form a saturated solution, and as a result, some separated liquid hydrogen fluoride will settle out in the bottom of reflux accumulator 32. This material, together with a substantial portion of the isobutane, is removed from the bottom of accumulator 32 through line 34 and returned to line 13 and alkylator 14 for reintroduction into the reaction zone. This stream will comprise the desired recycle isobutane stream.

In commercial operations it is substantially inevitable that some propane and lighter material will be present in one or more of the streams added through line 10 and/or 11. Unless some provision is made for removing this material from the system, it will tend to accumulate to an undesirable high concentration and reduce the efficiency of the plant, and may necessitate an increase in the operation pressure. A portion of the isobutane fraction, therefore, is withdrawn from line 33 through line 35 and passed to depropanizer 36. Depropanizer 36 is any desired type of fractional distillation column designed to withstand the corrosive action of hydrogen fluoride and to effect a separation between propane and lighter hydrocarbons and isobutane. However, since some of the hydrogen fluoride will tend to be contained in the overhead product, an olefin-containing material is added to depropanizer 36 through line 40. In accordance with a preferred embodiment of this invention, this olefin-containing material is a propane-propylene mixture. When this fraction is substantially free from $C_2$ and lighter hydrocarbons, it may be added at an intermediate part of depropanizer 36, such as by being added through line 41 directly to the feed line 35. However, in order to prevent contact between any ethylene which may be present and any large proportion of the hydrogen fluoride entering depropanizer 36 through line 35, it is preferred to add this material to a higher portion of the depropanizer if it contains any appreciable amount of ethylene. Such an addition may be made through line 42. A low-boiling fraction substantially free from hydrogen fluoride, isobutane, and alkyl fluorides, and containing a substantial proportion of propane and lighter hydrocarbons introduced to depropanizer 36 through lines 35 and 40, is removed through line 43, cooler and condenser 44, and passed to reflux accumulator 45. A portion of this material is returned to the top of depropanizer 36 through line 46 as a liquid reflux and the excess is discharged from the system through line 47. In many instances the material added through line 40 will contain more propylene than is molecularly equivalent to the hydrogen fluoride concomitantly entering the depropanizer through line 35, to ensure that the overhead product is essentially free from free hydrogen fluoride.

The propane stream in accumulator 45 will contain a small amount of hydrogen fluoride together with hydrogen sulfide and low-boiling mercaptans derived from the olefin-containing material introduced into depropanizer 36 through line 40. Since it is desirable to selectively remove the hydrogen fluoride, the propane stream is passed to caustic washer 52, as a liquid through line 47 or as a vapor through line 49, whichever is desired. In caustic washer 52, the hydrocarbon stream, in either the liquid or the vapor phase, is contacted countercurrently with a down flowing aqueous solution of sodium bisulfide entering through line 53. In liquid phase operation relatively high super-atmospheric pressures and relatively low temperatures are used and vapor phase operation is conveniently effected under similar conditions of temperature and pressure. By intimate contact between the sodium bisulfide solution and the propane stream, the hydrogen fluoride is selectively removed from the propane and hydrogen sulfide. Caustic solution containing sodium fluoride is removed from caustic washer 52 through line 56 while the treated propane stream substantially free from sodium fluoride but containing hydrogen sulfide and low-boiling mercaptans is removed through line 54. The purified propane stream may be used as a reactant or as a fuel.

The kettle product of depropanizer 36 comprises primarily isobutane and propyl fluoride, This material is withdrawn through line 50 and passed to lines 34 and 13 for introduction into alkylator 14. In some instances, particularly when ethylene is present in the stream added through lines 40 and 42, alkyl fluorides present in the kettle or lower portion of depropanizer 36 will tend to decompose and release free hydrogen fluoride. In order to inhibit such an undesired reaction it may be desirable to add olefins, particularly butylenes, to a low portion of depropanizer 36, as through line 48.

The kettle product from deisobutanizer 27 comprises the higher-boiling paraffin hydrocarbons produced in alkylator 14 and most of the normal butane which may be present in the effluents of the reaction zone. This material is passed from the kettle of deisobutanizer 27 through line 61 to defluorinator 62, wherein it is treated to remove any fluorine compounds which may be contained therein. This may be satisfactorily effected by contacting the stream with a material such as alumina, or bauxite, as disclosed in Frey 2,347,945, issued May 2, 1944, at about the same temperature as is used in the kettle of deisobutanizer 27. In the event that bauxite is used and the conditions are such that there is danger of silicon tetrafluoride being present in the effluents of defluorinator 62, lime may be included as a part of the contact mass. A substantially fluorine-free effluent is passed through line 63 to suitable separating means illustrated by fractionator 64. Normally butane is discharged from the system through line 65, a light alkylate friction is recovered through line 66 as a product of the process, and a heavy alkylate fraction is recovered through line 67, also as a product of the process. These materials may be subjected to any desired subsequent treatment and may be blended with other motor fuel ingredients to produce a premium motor fuel as is well known in the art.

The sodium bisulfide solution used to selectively absorb the hydrogen fluoride from the hydrocarbon stream containing the same together with hydrogen sulfide and low-boiling mercaptans may be made by mixing a 3 per cent solution of sodium hydroxide with hydrogen sulfide. The concentration of the sodium bisulfide may be determined at any time in the caustic washer by titrating the wash solution with standard hydrochloric acid using an indicator which changes color at a pH of less than 6.

It will be appreciated that this drawing is diagrammatic and there may be conventional pieces of equipment, such as heating chambers, reboilers, extra reaction zones, extra dehydrating equipment, defluorinating equipment, fractional distillation zones, coolers, and the like which have not been shown. However, such equipment may be supplied by those skilled in the art without departing from the scope of this invention and the drawing furnishes a sufficient guide to one skilled to practice the invention successfully.

The following example illustrates a specific embodiment of this invention. It is understood, however, that such example should not be interpreted as having an unnecessary limitation to the invention.

*Example I*

A typical vaporous stream of low-boiling hydrocarbons containing both hydrogen fluoride and hydrogen sulfide was treated to selectively remove the hydrogen fluoride according to this invention by contact with a solution of sodium bisulfide. Table I below shows a typical composition of such a low-boiling hydrocarbon fraction:

| Component: | Liquid volume, per cent |
|---|---|
| Ethylene | 1 |
| Ethane | 10 |
| Propylene | 9 |
| Propane | 79 |
| Butane | 1 |
| Total | 100 |

| | Weight, per cent |
|---|---|
| $H_2S$ | 0.2 |
| HF | 0.01 |

When the above hydrocarbon stream was washed with a caustic solution of sodium hydroxide at approximately atmospheric conditions of temperature and pressure in the conventional manner, the sodium hydroxide consumption is 434 pounds per 1,000 barrels of hydrocarbon and both the hydrogen sulfide and the hydrofluoric acid are removed. When the hydrocarbon mixture is washed with sodium bisulfide as herein before described, 47 pounds per 1,000 barrels of hydrocarbon is consumed and this may be made from about 34 pounds of sodium hydroxide. None of the hydrogen sulfide was removed; while the hydrogen fluoride was removed, the hydrogen fluoride remaining in the hydrocarbon stream being less than 0.0005 weight per cent. The sodium bisulfide wash solution is discarded when the pH drops below about 7.2 and replaced by a 3 per cent sodium bisulfide solution.

I claim:

1. The process for selectively removing hydrogen fluoride from an organic mixture comprising propane and lighter hydrocarbons, hydrogen sulfide and hydrogen fluoride which comprises contacting said organic mixture in the liquid phase with approximately a 2 to 4 per cent solution of sodium bisulfide in water under conditions such that the hydrogen fluoride in said organic mixture is selectively absorbed by said solution of sodium bisulfide and recovering an organic mixture substantially free from hydrogen fluoride but containing hydrogen sulfide.

2. The process for selectively removing hydrogen fluoride from an organic mixture comprising propane and lighter hydrocarbons, hydrogen sulfide and hydrogen fluoride which comprises contacting said organic mixture with solution of sodium bisulfide in water under conditions such that the hydrogen fluoride in said organic mixture is selectively absorbed by said solution of sodium bisulfide and recovering an organic mixture substantially free from hydrogen fluoride but containing hydrogen sulfide.

3. The process for selectively removing hydrogen fluoride from an organic mixture containing hydrogen sulfide and hydrogen fluoride and which is immiscible with water and inert with respect to sodium bisulfide which comprises contacting said organic mixture in the liquid phase with approximately a 2 to 4 per cent solution of sodium bisulfide in water under conditions such that the hydrogen fluoride in said organic mixture is selectively absorbed by said solution of sodium bisulfide and recovering an organic mixture substantially free from hydrogen fluoride but containing hydrogen sulfide.

4. The process for selectively removing hydrogen fluoride from an organic mixture containing hydrogen sulfide and hydrogen fluoride and which is immiscible with water and inert with respect to sodium bisulfide which comprises contacting said organic mixture with solution of sodium bisulfide in water under conditions such that the hydrogen fluoride in said organic mixture is selectively absorbed by said solution of sodium bisulfide and recovering an organic mixture substantially free from hydrogen fluoride but containing hydrogen sulfide.

5. A process for removing hydrogen fluoride from an organic mixture containing the same and which is immiscible with water and inert with respect to sodium bisulfide which comprises contacting said organic mixture with solution of sodium bisulfide in water under conditions such that the hydrogen fluoride in said organic mixture is absorbed by said solution of sodium bisulfide and recovering an organic mixture substantially free from hydrogen fluoride.

6. A process of preparing a hydrogen fluoride-free light hydrocarbon stream comprising propane which comprises contacting such stream from the effluent of an alkylation reaction between isobutane and a low-boiling olefin in the presence of a hydrogen fluoride alkylation catalyst with a solution of sodium bisulfide in water under conditions such that the hydrogen fluoride in said hydrocarbon stream is absorbed by said sodium bisulfide and recovering said light hydrocarbon stream free of hydrogen fluoride.

CARL S. KELLEY.

No references cited.